Patented Aug. 14, 1945

2,382,313

UNITED STATES PATENT OFFICE 2,382,313

HYDROXY ACID DERIVATIVES OF CAMPHENE

Clyde O. Henke, Wilmington, Del., assignor to E. I. du Pont de Nemours & Company, Wilmington, Del., a corporation of Delaware No Drawing. Application January 20, 1942, Serial No. 427,441

3 Claims. (Cl. 260—468)

This invention relates to hydroxy acid derivatives of camphene and methods of making the same and particularly to ethers derived from hydroxy acids and camphene.

It is known that unsaturated hydrocarbons, including unsaturated terpene hydrocarbons, may be condensed with simple alcohols to form ethers. It is also known that unsaturated hydrocarbons, including terpene hydrocarbons, will react with carboxylic acids to form esters. However, it has not been known that terpenes can be caused to react with hydroxy carboxylic acids to form acid-ethers and ester-ethers.

I have found that camphene can be caused to react with certain hydroxy carboxylic acids to form ester-ether derivatives which can, in turn, be converted to acid-ether derivatives, both of which types of compound are valuable, particularly as intermediates in the synthesis of other compounds. This reaction appears to be peculiar to camphene since I have been unable to obtain similar derivatives from other terpenes, such as pinene, dipentene, terpenolene and terpenene.

It is an object of my invention to produce certain ether compounds from camphene and certain hydroxy carboxylic acids, which compounds are new chemical compounds not known heretofore. A more particular object of my invention is to produce isobornyl acid-ethers and ester-ethers of aliphatic hydroxy carboxylic acids containing at least three carbon atoms and from one to two carboxyl groups, which ethers are new chemical compounds. Another object is to provide a method of preparing ethers from camphene and aliphatic hydroxy carboxylic acids. A further object is to provide a method of preparing ester-ethers by reacting camphene with aliphatic hydroxy carboxylic acids containing from one to two carboxyl groups and from the esters of such acids. A still further object is to provide a method of producing acid-ethers from camphene and aliphatic hydroxy carboxylic acids and their esters. Other objects are to provide new compositions of matter and to advance the art. Still other objects will appear hereinafter.

The above and other objects may be accomplished in accordance with my invention which comprises reacting camphene with aliphatic hydroxy carboxylic acids and their esters, which acids contain from one to two carboxyl groups, in the presence of condensation catalysts at temperatures up to 100° C. During the reaction, the camphene appears to undergo a re-arrangement so that the isobornyl derivatives are obtained. When the free hydroxy acid is employed, the camphene reacts therewith to form the isobornyl esters of the isobornyloxy acids. When esters of the hydroxy acids are employed, the camphene reacts to produce the isobornyl ethers of such acids. The resulting ester-ethers can be readily saponified to produce the salts of the isobornyl ethers of the acids, which yield the isbornyl ethers of the acids upon acidification. Those acid-ethers and ester-ethers, derived from hydroxy acids containing at least three carbon atoms, are new chemical compounds not known heretofore.

The reactions taking place may be represented by the reaction between camphene and malic acid as shown in the following equations outlining the essential steps in the process:

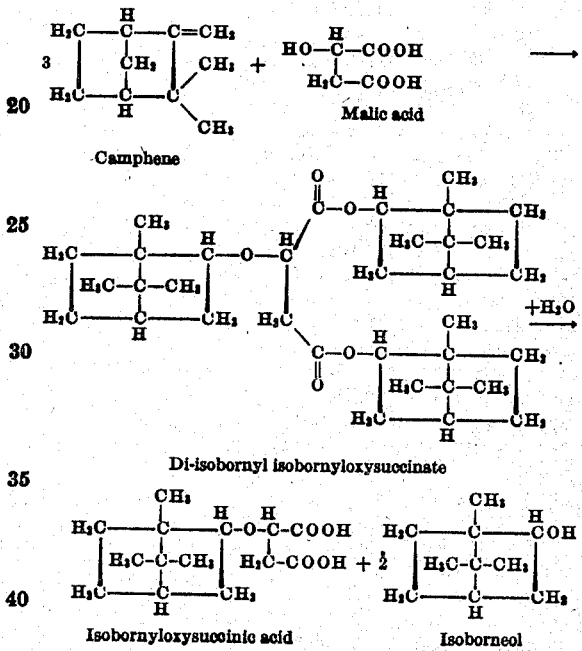

Most probably, two moles of the camphene rearrange and react with the malic acid to form the diester thereof and then one mole of the camphene re-arranges and reacts with the hydroxy group of such diester to form the ester-ether. Other terpenes may be caused to react with the hydroxy acids to form the esters thereof, but do not appear to react further to form the ester-ethers. Accordingly, the discovery that camphene could be caused to react to form the ethers was quite surprising.

When less than one molecular proportion of the camphene is employed for each carboxy group and each hydroxy group, mixtures of hydroxy esters and ester-ethers are generally obtained. Accordingly, I generally prefer to employ at least one molecular proportion of camphene for each carboxyl group and each hydroxy group. Usually, I prefer to employ camphene in such amount that there is at least 10% excess over that theoretically required to produce the ester-ether. Such excess camphene may be removed by steam distillation either before or after saponification.

The reaction is generally carried out by mixing the camphene, the hydroxy acid and a condensation catalyst at a suitable temperature and agitating the mixture until the reaction is complete. The temperatures employed may vary from as low as 20° C. up to 100° C. In order to avoid objectionable polymerization, temperatures above 100° C. should not be employed. The temperatures employed will largely depend upon the catalyst and the amount thereof. When sulfuric acid of 70% strength or stronger is employed as the condensation catalyst, the temperatures should ordinarily be maintained below 80° C. in order to avoid polymerization. It will generally be preferred to employ temperatures of around 20 to 40° C., and particularly room temperatures, when sulfuric acid of 50% strength or greater is employed as the catalyst. When weaker condensation agents, such as the organic sulfonic acids and weaker sulfuric acid, are employed, it will generally be preferred to employ temperatures of from about 80° C. to about 100° C. Lower temperatures may be employed with the weaker catalysts, but, in that case, the reaction is correspondingly slower and requires longer time to go to completion. When the weak catalysts are employed at the lower range of temperatures, improved results will be obtained by increasing the amount of the catalyst, for example, 3 to 4 times the amounts employed at the higher temperatures.

The condensation catalysts, which may be employed, are catalysts of the type ordinarily employed in the art for condensing unsaturated hydrocarbons with alcohols to produce ethers. The preferred catalysts, employed in my process, are sulfuric acid and the organic sulfonic acids, such as p-toluene sulfonic acid. When the sulfonic acids are employed, they will generally be employed in the proportion of about 2 to about 5% based on the amount of the hydroxy acid, and, in that case, temperatures of from about 80 to about 100° C. should be employed. Much larger proportions of the sulfonic acid, up to 50% or even higher, can be employed if desired. Preferably, I employ sulfuric acid as the catalyst. Such sulfuric acid may be of a strength as low as 10%. However, I preferably employ sulfuric acid of from 50 to 95% concentration and at temperatures of from about 20° C. to about 40° C., and particularly at room temperatures. The amount of sulfuric acid may vary from as little as 25% to as much as 200% of the amount of the hydroxy acid. Preferably, the sulfuric acid is employed in the proportion of from about 50% to about 100% of the amount of the hydroxy acid.

The hydroxy carboxylic acids, which are to be reacted with the camphene in accordance with my invention, are those which contain only 1 to 2 carboxyl groups. In other words, they are the hydroxy monocarboxylic acids and hydroxy dicarboxylic acids, wherein each carboxyl group and each hydroxy group are attached to carbon atoms of an aliphatic chain. Preferably, the hydroxy acids consists of the elements carbon, hydrogen and oxygen. Also, preferably, the hydroxy acids are the acyclic aliphatic acids, that is, those which contain no cyclic rings. Preferably, when the acid contains two carboxyl groups, they are directly bonded to different carbon atoms. I still further prefer the hydroxy acids which contain only 1 or 2 hydroxyl groups and particularly those in which no carbon atom carries more than one hydroxy group. While the broad class of acids, as above disclosed, may be employed in accordance with my invention, I have found that particularly desirable products are obtained from malic acid, glycolic acid, lactic acid, ethyl glycolate, dl mandelic acid and tartaric acid.

The ester-ethers may be purified by steam distillation or fractional distillation. They may be saponified in a suitable manner, such as with caustic soda or other suitable basic material in either an aqueous or alcoholic solution to thereby obtain the salt of the acid-ether. Such salts may be treated with a suitable acid, such as hydrochloric acid, sulfuric acid, acetic acid and the like, to release the free acid-ether. The free acid-ether may be purified by distillation, crystallization or by dissolving it in a basic solution and re-precipitating it with acid.

In order to illustrate my invention more clearly, the preferred modes of carrying the same into effect and the advantageous results to be obtained thereby, the following examples are given:

*Example 1*

Five hundred parts of glycolic acid and 2238 parts of technical camphene were charged into a 5 liter flask equipped with agitation. Twenty parts of p-toluene sulfonic acid were added and the mixture agitated for 18 hours at 90–100° C. At the end of this period, the product was steam distilled and 562 parts of camphene were recovered (F. P. 47°). The product was extracted with benzene and washed with water. Upon removing the benzene under vacuum, there was obtained 2476 parts of a compound with a saponification number of 119. This compound appears to be crude isobornyl ester of isobornyloxy acetic acid.

One thousand nine hundred and seventy-three parts of this material, 300 parts of caustic soda and 1000 parts of alcohol were heated on the steam bath for six hours. At the end of this period, the alcohol was removed under vacuum, benzene was added and the product extracted with water. The benzene layer contained 919 parts of crude isoborneol, analyzing 41.7%. The aqueous layer was acidified and extracted with benzene. Four hundred and seventy-seven parts of crude isobornyloxyacetic acid, analyzing 69.7%, yield 23.8%.

Upon distillation, 125–130° C. at 5 mm. or crystallization from petroleum ether, the pure acid is obtained, M. P. 80–82.

*Example 2*

One hundred and fifty parts of glycolic acid and 637 parts of technical camphene were charged into a 3 liter flask equipped with agitation. Sixty-three parts of 93% sulfuric acid were added gradually and the agitation continued for 24 hours. At the end of this period, the mixture was steam distilled. The product was dissolved in benzene, washed with dilute sodium bicarbonate solution and then with water. The benzene was removed under vacuum. The yield was 538 parts, saponification number 141.7, theory for isobornyl isobornyloxyacetate 160.9, yield 68.7%.

Example 3

One hundred and seventy-seven parts of 85% lactic acid and 500 parts of technical camphene were charged into a 3 liter flask equipped with agitation. Five parts of p-toluene sulfonic acid were added and the mixture agitated at 90–100° C. for 20 hours. At the end of this period, the mixture was steam distilled and the layers separated. There was obtained 250 parts of a product with a saponification number of 234.5, theory 154.6.

Two hundred and thirty-five parts of this product and 75 parts of caustic soda were charged into a three liter flask. Six hundred parts of alcohol were added and the mixture refluxed for 5 hours. At the end of this period, the alcohol was removed by distillation, benzene was added and extracted with water. The aqueous layer was acidified and extracted with benzene and the solvent removed under vacuum. Sixty-four parts of the terpene ether of lactic acid were obtained, yield 16.9%. Upon crystallizing from petroleum ether, a product was obtained with a melting point of 66° C. and a purity of 98.5%.

Example 4

One hundred and thirty parts of ethyl glycolate and 250 parts of technical camphene were charged into a 3 liter flask equipped with agitation. Three parts of p-toluene sulfonic acid were added and the mixture agitated at 90–100° C. for 18 hours. At the end of this period, the product was steam distilled, benzene added and the layers separated. The benzene was removed by distillation. Two hundred and thirty-five parts of the crude product was obtained with a saponification number of 200.2, theory 243.8, yield 64.3%.

The product distills 105–115° C. under 5 mm. vacuum, and, upon saponification, gives the terpene ether of glycolic acid, M. P. 81.9–82.5° C.

Example 5

Two hundred parts of dl mandelic acid and 716 parts of technical camphene were charged into a 3 liter flask equipped with agitation. One hundred parts of 50% sulfuric acid were added and the mixture agitated at room temperature for 18 hours. The temperature was then increased to 90–100° C. and agitation continued for 4 hours. The product was dissolved in benzene, washed with water, dilute sodium bicarbonate solution and finally with water. The benzene was removed under vacuum. The yield was 435 parts of material having an ester value of 117.2, theory 132, yield 54%.

Example 6

One hundred parts of malic acid and 600 parts of technical camphene were charged into a 3 liter flask. One hundred parts of 70% sulfuric acid were added and the mixture agitated for 26 hours at room temperature. The mixture was dissolved in benzene, washed with water and dilute sodium bicarbonate solution. The mixture was then steam distilled, extracted with benzene, and the solvent removed. There was obtained 559 parts of a compound with an ester number of 108.3. This compound appears to be crude di-isobornyl ester of isobornyloxysuccinic acid.

Three hundred and eighty-six parts of this product, 600 parts of ethyl alcohol and 100 parts of sodium hydroxide were refluxed for 12 hours. The alcohol was removed by distillation, benzene added, and the acid extracted with water. The aqueous layer, upon acidification, gave 113 parts of the isobornyl ether of malic acid with a purity of 92%, yield 77.4%, based on the malic acid used.

Example 7

Three hundred parts of glycolic acid, 1775 parts of technical camphene, and 150 parts of 70% sulfuric acid were agitated for 24 hours. At the end of this period, the mixture was steam distilled and 290 parts of camphene were recovered. After separating the aqueous layer, 1000 parts of 30% caustic soda were added and the mixture heated in an autoclave for 10 hours at 130° C. Benzene was then added and extracted with water. After acidifying and extracting with benzene, 995 parts of crude acid were obtained with an acid number of 139.9, yield 63%.

Example 8

One hundred parts of tartaric acid, 1088 parts of technical camphene, and 150 parts of 70% sulfuric acid were agitated at room temperature for 20 hours. At the end of this period, the mixture was steam distilled and 229 parts of camphene were recovered. After separating the aqueous layer, 600 parts of alcohol and 200 parts of caustic soda were added and the mixture refluxed for 12 hours. Benzene was then added and the acid extracted with water. The benzene layer contained 272 parts of isoborneol. The aqueous layer, after acidifying and extracting with ether, yielded 130 parts of a viscous product with an acid number of 264.8, theory for the di-ether of tartaric acid 265.

It will be understood that the above examples have been given for illustrative purposes only and that my invention is not to be limited to the specific embodiments disclosed therein. Many variations and modifications can be made in the process disclosed and the products produced within the broad disclosure hereinbefore given. For example, other aliphatic hydroxy carboxylic acids, containing from 1 to 2 carboxyl groups, may be employed in place of those hereinbefore mentioned. Representative of such other hydroxy acids are beta-hydroxy butyric acid, beta-hydroxy propionic acid, hydroxy malonic acid and tropic acid.

Likewise, other sulfonic acid condensation catalysts may be employed, such as benzene sulfonic acid, naphthalene beta-sulfonic acid, hexyl benzene sulfonic acid, isopropyl naphthalene beta-sulfonic acid and chlor heptane sulfonic acid. Also, other condensation catalysts, such as hydrogen fluoride, zinc chloride and aluminum chloride might be used.

Furthermore, the reaction conditions may be widely varied, such as by employing other temperatures within the range hereinbefore disclosed. The reaction may be carried out at atmospheric pressures or, if desired, it may be carried out in a closed vessel under elevated pressures. In some cases, an inert solvent may be employed, although this is generally unnecessary.

I claim:

1. The process of preparing ester-ethers of hydroxy acids which comprises reacting camphene with an acid of the group consisting of malic acid, glycolic acid, lactic acid, dl mandelic acid and tartaric acid, employing at least one equivalent of camphene for each hydroxy group and each carboxyl group of the acid, in the presence of an acid catalyst of the group consisting of sulfuric acid and sulfonic acids at temperatures up to 100° C.

2. The process of preparing the di-isobornyl ester of isobornyloxysuccinic acid which comprises reacting three molecular proportions of camphene with one molecular proportion of malic acid in the presence of sulfuric acid of about 70% strength at temperatures up to 80° C.

3. The process of preparing isobornyl isobornyloxyacetate which comprises reacting two molecular proportions of camphene with one molecular proportion of glycolic acid in the presence of sulphuric acid of from about 50% to about 95% concentration at temperatures of from about 20° C. to about 40° C.

CLYDE O. HENKE.